(12) United States Patent
Barnes et al.

(10) Patent No.: US 10,815,138 B1
(45) Date of Patent: Oct. 27, 2020

(54) TREATMENT OF ACID MINE DRAINAGE BY HYDRIDES, AND FORMATION OF ZERO VALENT IRON NANOPARTICLES

(71) Applicant: GeoKinetics, LLC, State College, PA (US)

(72) Inventors: Hubert Lloyd Barnes, State College, PA (US); Antonio C. Lasaga, New London, CT (US)

(73) Assignee: GeoKinetics, LLC, College, PA (US)

( * ) Notice: Subject to any disclaimer, the term of this patent is extended or adjusted under 35 U.S.C. 154(b) by 0 days.

(21) Appl. No.: 16/206,886

(22) Filed: Feb. 7, 2019

Related U.S. Application Data

(60) Provisional application No. 62/694,449, filed on Jul. 6, 2018.

(51) Int. Cl.
| | |
|---|---|
| *B32B 5/16* | (2006.01) |
| *C02F 1/52* | (2006.01) |
| *C02F 1/70* | (2006.01) |
| *C22C 38/00* | (2006.01) |
| *B22F 1/00* | (2006.01) |
| *C02F 101/20* | (2006.01) |
| *C02F 103/10* | (2006.01) |

(52) U.S. Cl.
CPC .......... *C02F 1/5245* (2013.01); *B22F 1/0044* (2013.01); *C02F 1/70* (2013.01); *C22C 38/002* (2013.01); *B22F 2301/35* (2013.01); *C02F 2101/203* (2013.01); *C02F 2101/206* (2013.01); *C02F 2103/10* (2013.01); *C22C 2200/04* (2013.01)

(58) Field of Classification Search
CPC ............ C02F 2102/203; C02F 2103/10; C02F 1/5236
See application file for complete search history.

(56) References Cited

U.S. PATENT DOCUMENTS

2014/0166583 A1\* 6/2014 Clements .............. C02F 1/5236
210/695

OTHER PUBLICATIONS

Jha & Varma, Removal of Iron and Sulphates from Acid Mine Drainage and Neutralisation of pH Using Chemical Process, IJESRT, Jha, 2(8): Aug. 2013]]. (Year: 2013).\*
Liendo et al., Synthesis of ZVI Particles for Acid Mine Drainage Reactive Barriers: Experimental and Theoretical Evaluation, J. Mater. Res. Tecnol. 2012; 1(2):75-79 (Year: 2012).\*
Dietz and Gourley, "Activated Iron Solids Treatment for High Flow Acidic Mine Drainage: Results of Pilot Studies", presented at the 2010 National Meeting of the American Society of Mining and Reclamation, Pittsburgh, PA, Jun. 5-11, 2010 (Year: 2010).\*

\* cited by examiner

*Primary Examiner* — Hoa (Holly) Le
(74) *Attorney, Agent, or Firm* — Michael D. Eisenberg

(57) ABSTRACT

Acid mine drainage is treated with borohydride under conditions to yield highly pure iron nanoparticles. The resulting, unique, iron nanoparticles are also described.

25 Claims, 3 Drawing Sheets
(3 of 3 Drawing Sheet(s) Filed in Color)

TREATMENT OF ACID MINE DRAINAGE BY HYDRIDES, AND FORMATION OF ZERO VALENT IRON NANOPARTICLES

CROSS-REFERENCES TO RELATED APPLICATIONS

The present application claims priority from U.S. Provisional Application Ser. No. 62/694,449 filed on Jul. 6, 2018, which is hereby incorporated herein by reference in its entirety.

FIELD OF THE INVENTION

This invention relates generally to the control and treatment of acid mine drainage (AMD). More specifically, the invention relates to the removal of iron by a chemical reduction process using borohydrides and to the production of valuable nanoparticles from the AMD, particularly zero-valent iron (ZVI) nanoparticles.

BACKGROUND OF THE INVENTION

The AMD Problem

Excavation of rocks containing pyrite exposes sulfide mineral surfaces to reactions with water and oxygen that generate polluting sulfuric acid solutions. This process is common in road construction and in mining, especially of coal. The magnitude of the problem is evident from the roughly 12,000 miles nationally, 3,000 miles in Pennsylvania, of AMD-contaminated rivers and streams (Johnson and Halberg, 2005, Sci. of the Total Environ., 338, 3-14). Further, coal mines, often abandoned, have acidic effluents with flow ratesthat are commonly at about 500,000 gal/day but may be much higher reaching values up to 50 million gal/day, based on data from 140 abandoned coal mines in Pennsylvania, as described in Cravotta, C. A, Dissolved metals and associated constituents in abandoned coal mine discharges, Pennsylvania, U.S.A.: Applied Geochem., 23, 166-226, 2008.

Besides the sulfuric acid of such drainage, there are characteristic solutes, especially Fe, Mn and Al, and the more toxic As and Pb, plus 16 other elements that occur in pyrite at concentrations above 0.4 ppm. (Abraitis, et al., 2004, Int. J. Mineral. Process., 74, 41-59). Listed below are representative concentration ranges of the more common solutes in AMD from the dissolution of pyrite and associated minerals, in mg/liter. The results are comparable to the concentrations found in Cravotta, U.S. Geological Survey.

TABLE 1

Concentrations of Solutes in AMD, mg/liter (Cravotta, 2008, Applied Geochem., 23. 166-202, Table 1; Cravotta and Brady, 2015, Applied Geochem. 62, 108-130, Table 1)

| Solute | $SO_4$ | Fe | Mn | Al | Cu | Ni | Zn | Pb | As |
|---|---|---|---|---|---|---|---|---|---|
| Typical Range | 34-11,000 | 46-512 | 19-7,400 | 7-108,000 | 0.4-190 | 2.6-3,200 | 0.6-10,000 | 0.05-11000 | <0.03-64 |
| Maximum Range | 14.7-11,000 | <10-4,100 | 19-7,400 | <10-108,000 | <0.001-190 | <0.002-3,200 | <0.003-10,000 | <0.01-11000 | 0.001-64 |

These concentrations are found in the clear water of AMD before downstream reactions with air that precipitate ferric oxyhydroxides (colloquially called "yellow boy"). Precipitation commonly begins as far as many tens of meters from the weathering sources. The acidity of AMD, both clear, and after iron precipitates, is generally at pHs of 2.3-6.5 (Nordstrom, 2011, Appl. Geochem., 26, 1777-1791). Commonly, these polluted waters are treated with hydrated lime, $Ca(OH)_2$ or less frequently with NaOH, but these are less desirable because their solutions are unbuffered, strongly alkaline, and can raise the pHs of outflow above pH 10—extreme pollution levels.

In one patented procedure, Clements in U.S. Pat. No. 9,334,180, acid mine discharge was treated with a commercial composition, BoroMet 1240, which is a mixture of sodium borohydride and sodium hydroxide. The acid mine discharge immediately turned green and a fluffy green precipitate formed. Clements reports that precipitation can be accelerated by placing magnets in the treated streams. The precipitate is reported as having high amounts of boron, calcium, magnesium, and sodium.

SUMMARY OF THE INVENTION

In a first aspect, the invention provides a method of precipitating iron nanoparticles from acid mine discharge, comprising: providing a dilute iron solution comprising 5 to 5000 ppm by mass iron and having an O2 concentration of 4 ppm by mass or less; and adding sodium or potassium borohydride into acid mine discharge to precipitate iron nanoparticles. In this method, no hydroxide or substantially no hydroxide is added to the acid mine discharge.

The precipitated iron nanoparticles should be black, and there should not be precipitates of other colors. Preferably the precipitated iron is at least 95%, or at least 98% single phase material based on peak intensity as measured by TEM, SEM, EDS, and HAADF-STEM. "Substantially no hydroxide" means that there is insufficient hydroxide to form any other precipitates such as resulting in a green precipitate.

In various preferred embodiments, the method is further characterized by one or any combination of the following: wherein the dilute iron solution has an O2 concentration of 10 ppm by mass or less or 1 ppm by mass or less, or 0.5 ppm or less; wherein the method is conducted in the solution temperature range of 1 to 30° C., preferably 10 to 20° C.; wherein the borohydride is added in at least a 1:1 molar amount with Fe in solution; wherein the addition of borohydride precipitates at least 90% of the Fe from solution; wherein the borohydride is added in an amount of 2:1 molar amount or less with Fe and precipitates at least 50%, or at least 70%, or at least 90% of the Fe from solution; wherein the precipitate comprises at least 90%, or at least 95% Fe; wherein the precipitate is collected on baffles in a flowing stream; wherein pH is maintained between 3 and 8, preferably 6 and 8, in some embodiments 5 or less (the term "maintained" means maintained throughout the precipitation of the iron nanoparticles); wherein the borohydride is added into a flowing stream, or added into a stirred tank; wherein the sodium or potassium borohydride is added as a powder or in solution; wherein the dissolved iron concentration in the acid mine discharge is maintained at 10 ppm Fe or more; wherein the AMD comprises at least 10 ppm Fe, or at least 50 ppm Fe, or at least 100 ppm Fe, or at least 150 ppm Fe, in some embodiments in the range of 10 ppm to 5000 ppm, or 30 ppm to 300 ppm, or 10 ppm to 200 ppm; wherein the AMD comprises at least 0.1 ppm, or at least 1 ppm of: Cu, Zn, Mn, S, Si, Al, Ni, or As, or any combination thereof; wherein the AMD comprises at least five (or all) of the species selected from the group consisting of: SO4 15-11,000 ppm, Fe 10-4,100 ppm, Mn 19-7,400 ppm, Al 7-108,000 ppm, Cu 0.4-190 ppm, Ni 2-3,200 ppm, Zn, 0.5-10,000 ppm, Pb 0.1-11,000 ppm, and As 0.002-54 ppm; wherein the method removes at least 80% of Fe from the dilute iron solution; wherein the dilute iron solution comprises at least 5 ppm Mn, and wherein the method removes a first percentage of Fe from the AMD and a second percentage of Mn; wherein the first percentage is higher than the second percentage (likewise, the inventive method can be characterized by similar selectivity with respect to Mg, Ca, S, or Cu); wherein the first percentage is at least two times, or at least three times, or at least 10 times that of the second percentage.

In a second aspect, the invention provides a collection of iron nanoparticles, wherein the iron nanoparticles are normally magnetic and comprise at least 80 wt % Fe; and further comprising at least two of the following: 0.03 to 1.0 wt % Mg; 0.05 to 2.0 wt % Ca; and 0.03 to 1.0 wt % S. A "collection" has its common meaning, preferably at least 0.1 g, or at least 0.5 g. "Nanoparticles" are particles that have a number average diameter in the range of 1 nm to 500 nm. Typically, the iron nanoparticles are ferromagnetic.

In various preferred embodiments, the collection of iron nanoparticles is further characterized by one or any combination of the following: wherein either number average or mass average of iron nanoparticles is in the range of 5 to 100 nm; or 10 to 50 nm; or 20 to 40 nm; wherein the particles have a number average aspect ratio of 5 or less, or 2 or less, or in the range of 1 to 2; wherein the collection of nanoparticles is dispersed in acid mine discharge; wherein the iron nanoparticles comprise at least 90 wt %, or at least 92 wt %, or at least 95 wt %, or at least about 98 wt %, or at least 99 wt % Fe; wherein the iron nanoparticles comprise 0.05 to 0.5 wt % Mg, up to about 1.0 wt % K, 0.05 to 0.7 wt % Na, 0.2 to about 5 wt % Ca; and about 0.1 to 0.5 wt % S; wherein the iron nanoparticles comprise 0.03 to 1.0 wt % Mg; 0.05 to 2.0 wt % Ca; and 0.03 to 1.0 wt % S; wherein the iron nanoparticles comprise a zero valent iron core and an iron oxide shell.

The normally magnetic nanoparticles can be used in any application in which iron nanoparticles are used. The trace elements present in the inventive compositions enable the particles to be distinguished from other iron nanoparticles and can be used, for example, in tracer applications.

"Acid mine discharge" also known as "acid mine drainage" (AMD) is an aqueous solution having pH of 7 or below, typically below 6, and contains minerals dissolved from underground sources, most typically mines, but may be other sources. For purposes of the present invention, AMD comprises at least 5 ppm Fe, more preferably at least 10 ppm Fe. In some embodiments, AMD is in the range of 10 to 4000 ppm, or 10 to 200 ppm, or 10 to 40 ppm.

Unless otherwise specified, concentrations or percentages are by mass throughout this specification.

Unless otherwise specified, "particle size" refers to the number average particle size measured by transmission electron microscopy (TEM). See Jarsbski et al., "Determining the size of nanoparticles in the example of magnetic iron-oxide core-shell systems," J. Phys. Conf. Ser. 885 012007. For non-spherical particles, particle size (number average) is based on the largest dimension. Alternatively, particle size can be determined using dynamic light scattering. See, for example, Bogren et al., "Classification of Magnetic Nanoparticle Systems—Synthesis, Standardization and Analysis Methods in the Nanomag Project," Int. J. Mol. Sci. 2015, 16, 20308-20325.

The invention is often characterized by the term "comprising" which means "including," and does not exclude additional components. In narrower aspects, the term "comprising" in descriptions of the inventive concepts may be replaced by the more restrictive terms "consisting essentially of" or "consisting of."

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
FIG. 1 is a photograph illustrating precipitate of iron nanoparticles from Packer 5 test site in two-inch containers, according to some embodiments of the present invention.

The process is based on treating typical AMD by reactions with borohydrides that reduce dissolved iron under controlled acidity and to simultaneously precipitate nanoparticles of iron. The dominant reactions for dissolved iron can be written:

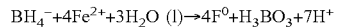
$$BH_4^- + 4Fe^{2+} + 3H_2O \, (l) \rightarrow 4F^0 + H_3BO_3 + 7H^+$$

where the hydride reactant may be added either in an aqueous solution or as a powder. This reaction will be in parallel and competing for the $BH^-_4$ anion with the hydrolysis reaction:

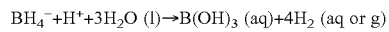
$$BH_4^- + H^+ + 3H_2O \, (l) \rightarrow B(OH)_3 \, (aq) + 4H_2 \, (aq \text{ or } g)$$

The core concept is the production by reduction of nanosize iron precipitates, namely very valuable zero-valent iron nanoparticles (ZVI nanoparticles). It is the powerful reducing capability of sodium borohydride (SBH), or similarly potassium borohydride, their rapid reactions, and their manageable chemistry that favors the production of the valuable zero-valent iron nanocrystals in an AMD setting. The precipitate from reactions of SBH with AMD is valuable only if it is dominantly of metallic iron and in nanoparticles, ideally crystalline. In that form, it is useful in an array of applications, such as waste remediation. The crystallization processes that form such miniscule particles minimize contamination from dissolved copper and other metals that may be present at different AMD sites, so those traces in the AMD may not be deleterious. Because the concentrations of those other metals are so low in most AMD, even if they were to precipitate along with the iron nanocrystals, they are unlikely to have a significant effect on the behavior of the iron nanocrystals in aggregate. Where the AMD has significant copper content, it could be worthwhile to recover it also; copper nanoparticles (also valuable) can be made via SBH reduction and then separated physically from earlier precipitating iron nanocrystals (ideally magnetically separated) for other uses.

Iron Reduction Mechanism(s)

The key reaction involved in our process is the reduction of dissolved iron in an AMD by borohydride. The mechanism of reduction of iron by borohydride in the treatment of iron-rich AMD solutions is discussed below. Of several studies reporting on that process, the primary focus was on whether it was possible to identify a reaction that would result in the precipitation of native iron in any amount at all from solution. As a result, the details of the iron reduction mechanism, as well as the overall rate laws, have not been resolved to a satisfactory degree and this resolution is an important aspect of our work. While the iron reduction rate has been shown to be relatively fast for high iron concentrations (>0.1 M Fe), the exact comparison with the hydrolysis rate of borohydride at various pHs and lower iron concentrations, requires more knowledge of the underlying iron reduction mechanisms. If each $H^-$ in $BH_4^-$ is reduced to $H^+$ and the two electrons are given to an $Fe^{2+}$, then the overall dominant reaction would be:

$$BH_4^- + 4Fe^{2+} + 3H_2O\ (l) \rightarrow 4Fe^0 + B(OH)_3\ (aq) + 7H^+ \quad (a)$$

Such a reaction has been written by several researchers. However, with the presence of 6 waters of hydration surrounding each $Fe^{2+}$, it would be difficult for every hydride ion to penetrate and directly donate its electrons to $Fe^{2+}$. In addition, if $Fe^{2+}$ is surrounded by 6 waters of hydration, then it is also sterically difficult for the borohydride ion to attach itself directly to the iron. On the other hand, any combination of $H^-$ with an $H^+$ in $H_2O$ (water of hydration) will produce hydrogen, $H_2$ (aq or g). The extent of hydrogen formation will determine the appropriate overall reaction.

However, if $Fe(OH)^+$ is the appropriate reactive intermediate (or more precisely, $Fe(H_2O)_5(OH)^+$), then it could be sterically possible to have an $H^-$ from $BH_4^-$ attach itself to the Fe and initiate an electron transfer. If two electrons are transferred and the resulting $H^-$ combines with the OH in $Fe(OH)^+$, then $Fe^0$ and $H_2O$ are formed, i.e.

$$Fe(OH)^+ + BH_4^- \rightarrow Fe^0 + H_2O\ (l) + BH_3\ (aq) \quad (b)$$

The $BH_3$ produced can hydrolyze as usual, i.e.

$$BH_3\ (aq) + 3H_2O\ (l) \rightarrow B(OH)_3(aq) + 3H_2\ (aq\ or\ g) \quad (c)$$

Of course, because $Fe(OH)^+$ is a minority species, we also have formation by $$Fe^{2+} + H_2O\ (l) \rightarrow Fe(OH)^+ + H^+ \quad (d)$$

Adding these reaction (a), (b), (c) and (d) gives a new overall Fe-reduction reaction:

$$BH_4^- + Fe^{2+} + 3H_2O\ (l) \rightarrow Fe^0\ (s) + B(OH)_3\ (aq) + 3H_2\ (aq\ or\ g) + H^+ \quad (e)$$

Finally, if just one $H^-$ from $BH_4^-$ is used to donate one electron to ferrous iron (again possibly in an Fe complex) and the rest of the hydride ions just combine with $H^+$ to make $H_2(aq)$, then we get the other extreme (which coincides with the mechanism of Glavee, et al. (1995)):

$$2BH_4^- + Fe^{2+} + 6H_2O\ (l) \rightarrow Fe^0\ (s) + 2B(OH)_3(aq) + 7H_2\ (aq\ or\ g)) \quad (f)$$

where the $Fe^{2+}$ in each of reactions (a), (e), and (f), could be more properly written $Fe(H_2O)_6^{2+}$ adding the waters of hydration explicitly. Note that the expected effect of pH on the rate of iron reduction varies markedly from very strong in reaction (a), to less strong in reactions (e) and (f).

In all cases, the effect of increasing the pH is to make the hydrolysis reaction significantly slower; on the other hand, increasing the pH should favor (perhaps strongly) the iron reduction reaction. These opposing effects can be controlled in the treatment of AMD waters. Also note that the ratio of borohydride needed to reduce ferrous ion in the overall reaction varies by a factor of 8 from reaction (a) to reaction (f), a key factor in terms of overall cost.

Rates of These Processes

Both the rates and paths of the borohydride hydrolysis and iron reduction reactions depend upon the concentrations of the reactants and pH but less so on temperature, due to the small variation expected in the ambient temperatures of the fluids.

1. For critical reactions where experimental rates are not yet known, often quantum chemistry-based ab initio calculations can be carried out to provide reliable approximations. Quantitative evaluation of these rates is crucial as bases for optimizing the flow rates and the amounts of AMD that can be treated effectively. Ab initio calculations of the rates, like those above for hydrolysis, can be used to predict the probable sequence of reactions and concomitant pH changes, both of which can aid in developing engineering systems for optimizing recovery of the metal precipitates and to decrease the solute concentrations of the AMD for disposal.

2. Published measurements reveal that dissolution of SBH is quick and that neutralization of AMD has a rate that is proportional to the concentration of $H^+$ and so is particularly fast at low pHs but decreases to lower rates at higher pHs, especially above neutrality.

3. Similarly, published studies of the reduction rates of dissolved metal ions by SBH show rapid reaction rates under industrial settings (high Fe concentration). These rates also are dependent on hydride and metal concentration and again are pH-dependent but in an opposite sense to the hydrolysis rates. The overall rate of iron reduction probably has a dependence on conditions such as (Lasaga, 1998):

$$\text{Rate} = k(T) a_{H^+}^n c_{Fe^{2+}}^m \quad (g)$$

In equation (g), n<0 and m=1 (or possibly 2 as in Kim and Brock, 1987). Evaluation of the exponent n is crucial for evaluating reduction rates for design modelling. The dependence of the reduction rate on the transition metal concentration can play an important role in predicting the composition and size of the local nanoparticles being produced by the treatment of the AMD.

Rates of Iron Reduction at AMD Sites

A key concern was whether the rate of iron reduction was fast enough to produce nanoparticles from iron concentrations of much more dilute AMD effluents. None of the previously published studies of the reduction of iron or other metals using borohydride by academia or industry had examined reactions at relatively low (10-200 mg/L) iron concentrations, such as in many AMD effluents. Based on ab initio modeling and molecular kinetic considerations, Dr. Lasaga, concluded that the precipitation rates should indeed be fast enough and that the product would be iron nanoparticles calculated to be primarily between 5 and 300 nm diameter. The value of those nanoparticles varies depending upon size (10-100 nm), crystallinity, purity, and compositional layering. Their characterization must be determined by methods that can resolve conditions in solids at molecular dimensions.

The titration results from the Packer 5 mine site in PA, where early experiments were performed, were very successful and clearly supported our expected reactions. The titration with hydride reactants effectively reduced 97% to 98% of the dissolved iron from a low concentration of only 18 mg/liter to precipitate as solid iron particles. The results from the titration tests at two AMD test sites (Porter Tunnel and Packer5 in Schuylkill County, PA) indicated that indeed the ferrous concentration in the effluent was substantially removed and native iron precipitated by reaction with the sodium borohydride even at the low concentrations of dissolved iron in this case. With careful control of acidity (typically want pH<8.1 but generally depending on the alkalinity and the concentration of other species in the AMD solution, excessive pH will lead to precipitation of unwanted carbonates and hydroxides), while keeping the AMD very reduced, the added SBH can cause crystallization of the nanocrystal iron without precipitation of any manganese or aluminum, an objective that is apparently feasible. The inference is that the powerful reduction reaction of the dissolved ferrous iron by the borohydride is on a 1:1 proportion basis that also produces acid (namely reaction (e) above), thereby stabilizing the $H^+$ consumption of borohydride hydrolysis (see reactions above).

Results from detailed high-resolution sub-microscopic analysis of the nanoparticles indicate that the precipitate is composed of nearly pure iron and that the borohydride is producing iron nanoparticles (minimum size about 5 nm) demonstrating that zero-valent iron is indeed being formed. Under the AMD effluent conditions, no other chemical process is capable of removing virtually all of the dissolved iron except the reduction by borohydride to produce ZVI at pH 6-7. However, subsequent excessive oxidation of the solids can be a problem, especially with very small nanoparticles (5 nm). In a test at the Packer 5 source, the oxygen concentration of the effluent, about 0.3 mg/liter; clearly is insufficient alone to oxidize the 18.2 mg/liter of $Fe^{2+}$ in the initial solution. Subsequent to the formation of the elemental iron nanoparticles, with no additional oxygen, only minor oxidation can take place and it forms outer coatings on the particles. The extent of oxide coating can be mitigated by using higher dissolved iron concentrations to form larger nanoparticles (50-100 nm) so that the oxide coating is a smaller proportion of the total volume of the particles. Furthermore, careful isolation from oxygen during sampling and storage processes (see below) can prevent harmful oxidation.

In effluent tests of AMD with very low iron concentration, the combined pH and amount of hydride powder used effectively reduced the dissolved ferrous iron of the AMD to precipitate 5 nm magnetic particles. In fact, there have been no published data for iron reduction at the low concentrations below 20 mg/L of our early test sites and similar AMD effluents. Initially, we were uncertain if the reduction reaction would be fast enough in comparison to competing reactions, such as borohydride hydrolysis. The tests showed unequivocally that the iron reduction is indeed fast enough even at these low iron concentrations and pHs as low as 6 or less. That was a very important conclusion and showed that this process is viable for adoption as a profitable industrial process. Our multiple field tests showed that, where the AMD was near neutral, the ferrous concentration was above 10 mg/liter, and the oxygen concentration was below 5 mg/liter, the added dissolved or powdered hydride caused very rapid precipitation of iron nanoparticles. For example, the amount of dissolved iron that was precipitated in the more accurate tests at the Packer 5 site is shown by the decrease in dissolved iron from near 18.5 mg/liter to 0.35 mg/liter (see Table 2 below), a remarkable 98% recovery in spite of the very low initial iron concentrations of only 9 and 19 mg/liter at the sites. These were initially magnetic proving reduction to $Fe^0$ but required rapid isolation to prevent oxidation. These results clearly indicate that higher initial iron concentrations would produce bigger nanoparticles in the 50-100 nm range and that the reductants can be effective as either hydride solutions or powders (see Table 4 below).

To be certain that samples from the tests remain unoxidized for later analyses, they must be sealed free of air quickly. A standard system by Impak can be adapted to preserve the sample in gas-tight containers, as shown in FIG. 1. A variety of Mylar bags and sealing clips are commercially available for particle isolation, and for use in such bags, both oxygen absorbers, and indicator pellets will reveal the oxygen content of the internal bag atmosphere. The Impak system is expected to retain the quality of samples for at least 3 months without deterioration, a problem affecting our previous testing. This system could be adapted to a commercial scale once it has been adapted to our procedures.

TABLE 2

Test results from the Packer 5 site in Schuylkill County, PA

| Site | Flow (gal/min) | pH | Oxygen (mg/liter) | Fe (mg/liter) |
|---|---|---|---|---|
| 1. borehole | 2,000 | 6.41, 6.31, 6.39 | 0.37, 0.33 | 18.93, 18.55, 18.48 |
| 2. borehole & breach, Boro hall | ~900,000 | 6.31, 6.2, 6.33 | 2.09, 2.4, 2.87 | 18.4, 17.7, 18.9 |
| 3. +hydride sol'n 1 | | | | 0.35 |
| 4. +hydride sol'n 2 | | | | 0.55 |
| 5. +hydride powder | | | | 0.37 |

The initial flow 1 and mixed at 2 (see Table 2), retained its ferrous iron prior to borohydride addition, but precipitated over 95% of its dissolved ferrous iron when mixed with either hydride solution or powder. That percentage increased where the initial iron concentration increased, especially near or above 200 mg of ferrous iron per liter.

The conclusion from the tests at the Porter Tunnel and Packer 5 mine sites is that borohydride can be used to produce zero-valent iron nanoparticles from effluent AMD solutions, even at the low iron concentrations of these particular solutions, specifically 8 and 18 mg/liter. Tests with higher iron concentrations, 227 mg/liter, were carried out at bituminous Clyde Mine, Clarkesville, Pa. with very similar results with magnetic, high purity iron nanoparticles produced as in Table 3. The presence of elements such as Mg, K, Na and/or Ca, although in very small amounts, reflects the AMD conditions in the production of the nanoparticles.

TABLE 3

Clyde Mine Elemental Analysis of ZVI Nanoparticles (excluding oxygen added during sampling and analyses; EDS results from Penn State Materials Research Institute)

| | Mass wt % | | | | | |
|---|---|---|---|---|---|---|
| Sample | Fe | Mg | K | Na | Ca | S |
| A | 92.35 | 0.43 | 0.97 | 0.66 | 5.12 | 0.46 |
| B | 97.57 | 0.18 | 0.03 | 0.28 | 1.62 | 0.32 |
| C | 97.82 | 0.15 | 0.04 | 0.09 | 1.76 | 0.13 |
| D | 99.52 | 0.07 | 0.00 | 0.11 | 0.20 | 0.10 |

Nanoparticle Sizes

Figure 2:
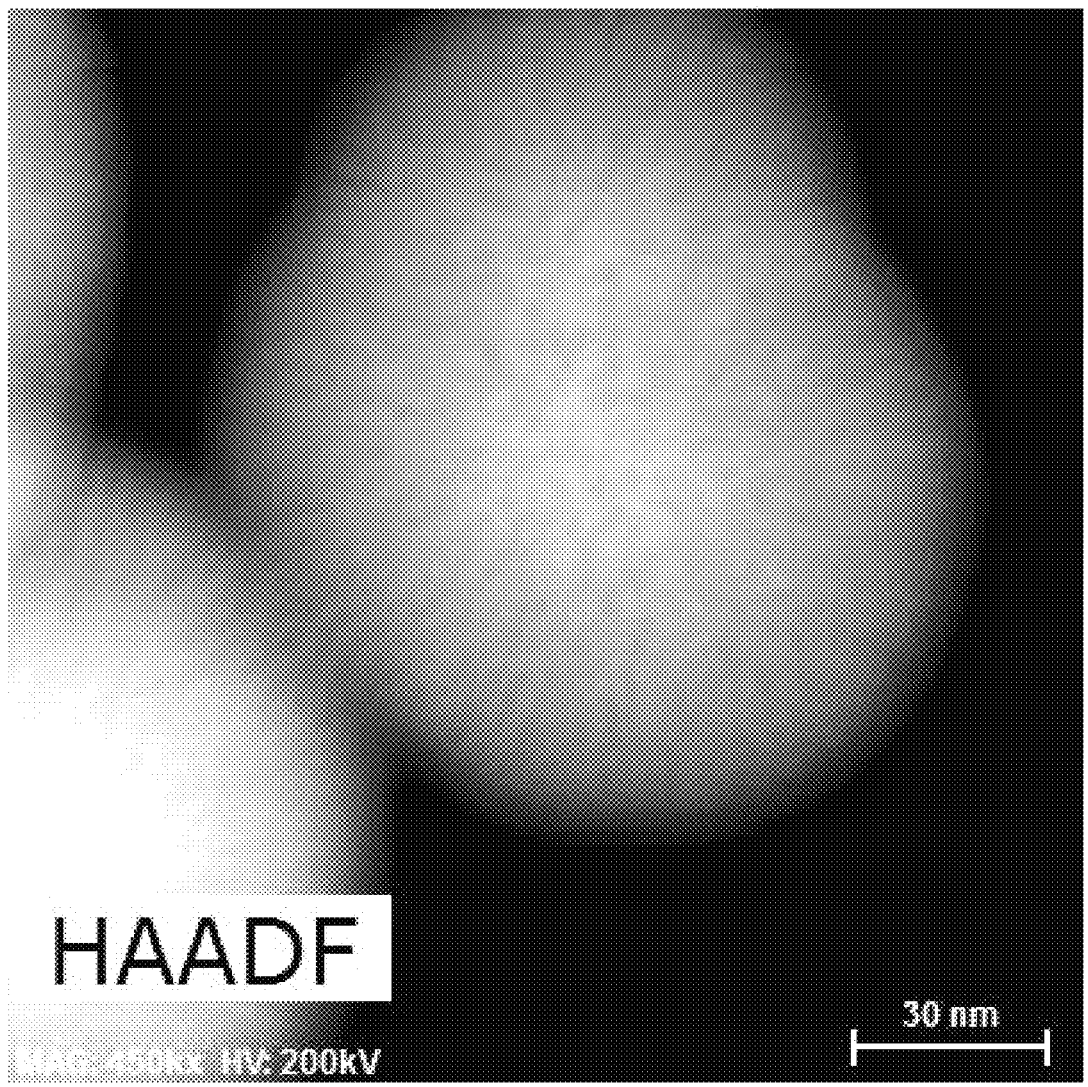
FIG. 2 is a high-angle annular dark-field imaging (HAADF) photograph of nanoparticles from the Clyde Mine tests produced via a technique of the present invention.
Figure 3:
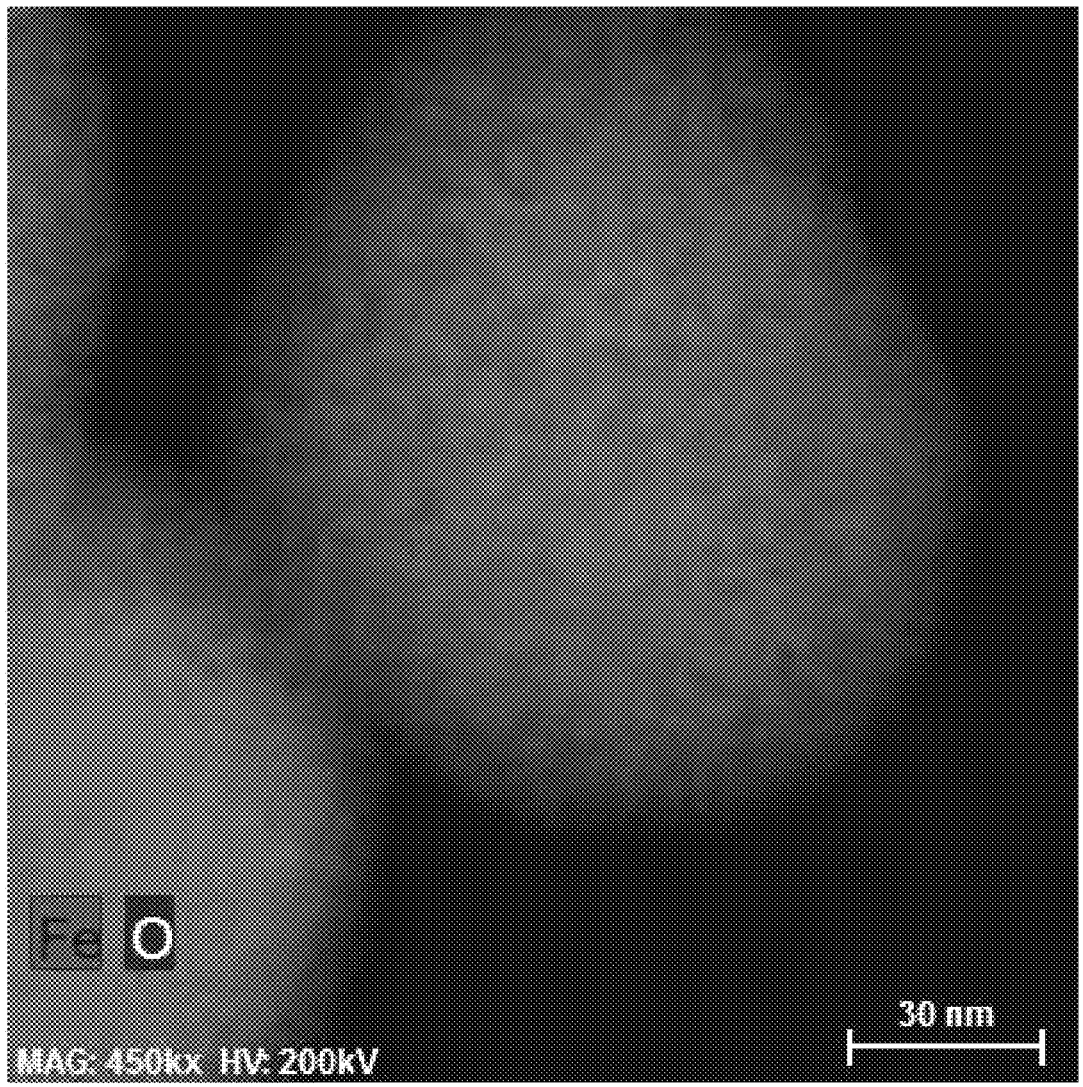
FIG. 3 is Energy-dispersive X-ray spectroscopy (EDS) photograph of nanoparticles from the Clyde Mine tests produced via a technique of the present invention.

The size of the nanoparticles produced by our methods is the result of nucleation and growth from the AMD. The very fast formation of iron nanoparticles is a diffusion-limited growth as is the nucleation of the particles. The kinetics of particle growth can be calculated and can be used to predict the variation of characteristic nanoparticle size with iron concentration in the AMD solution. Those expected sizes can be compared with our test results. The Packer 5 data with an average nanoparticle size of 5 nm grew from an average of 18 mg of iron/liter, values that establish a base for the calculation. The prediction of nanoparticle size as a function of iron concentration are given in Table 4. Those results are nicely confirmed by particle sizes just above 100 nm produced from Clyde Mine iron concentrations of 227 mg/liter. Photos of nanoparticles from the Clyde Mine tests shown in FIGS. 2 and 3 illustrate the shapes and surface oxygen content of these particles. As seen in the photos, the oxygen content is limited to a very thin outer layer of the zero valent iron (zvi) nanoparticles.

TABLE 4

| Correlation of Nanoparticle Sizes vs Fe Concentrations in Parent AMD Solutions | |
|---|---|
| Fe Concentration (mg/liter) | Nanoparticle Sizes (nm) |
| 18 | 5.0 |
| 50 | 19.5 |
| 100 | 49.2 |
| 150 | 84.5 |
| 200 | 124.0 |

Given the very high flow rates and iron concentrations of many sites from anthracite sources and, the much higher iron concentrations from bituminous mines, the prospect is favorable for massive production of iron nanoparticles of industrial quality nanoparticles. For example, for Packer 5 with 900,000 gallons/min and 18 mg/liter of dissolved Fe, that translates to a precipitate of 61.3 kg iron nanoparticles/min. At a conservative value of $200/kg, the production gross value would be $12,260/min less the cost of the SBH (about $20/kg of SBH) equivalent to a net return of $11,430/min.

The Collection of Precipitated Metals.

1. A continuous process is preferred because it can be more economical and more practical, especially for those mines having an enormous flow in excess of a half million gallons per day. The methods described here aim at nearly continuous processing. Recovery of iron nanocrystals from the flowing waste waters and separation from other solids in a first tank could take advantage of electromagnetic fields strong enough to transfer the iron onto charged downstream baffles.

2. The iron nanoparticles collected in a first tank can be flushed from retaining baffles by intermittent magnetic fields. Local small vents, designed for flushing an iron-rich layer could be opened during magnetically inactive periods to flush much of the iron particles by an intermittent, quick outflow of the AMD while the magnets were concurrently inactive.

3. A second tank can be used to collect any other metals that were coprecipitated and then carried in the AMD downstream away from the iron recovery baffles. At least two options might be considered for collecting these metals (mostly Cu, Cd, Zn, Ni, and Pb) that are carried from the first tank and into the second by the AMD flow. If the flow in the second tank were spiraled to centripetally force the suspended particles against a curved tank wall, the particles could move as a sludge slowly downstream along that wall and out through spaced, narrow peripheral slots to be collected with minimal flow of the AMD fluid.

An alternative method for the second tank would be to install microfilters to collect the particles from the AMD downstream from the iron recovery baffles. Such polish-filters would need to be flushed periodically to collect the concentrated metal precipitates from the residual AMD, prior to its disposal.

The data for 140 abandoned coal mines in Pennsylvania from Cravotta (2008) gives a range of flow rates from a minimum of 640 gal/day to a maximum of 50 million gallons/day. For perspective on the quantities involved, the table below lists the amounts of three metals that are carried in a representative AMD using the median flow rate of 420,000 gallons/day. But note that the range of flow rates is so wide that there are a large number of mines that have flow rates in the millions of gallons/day, easily yielding quantities 10 times those in Table 5.

TABLE 5

| Representative Daily Metal Contents of AMD from 500,000 gallons/day flow | | |
|---|---|---|
| Metal | mg/liter | Kg/day |
| Fe | 200 | 380 |
| Cu | 25 | 48 |
| Zn | 50 | 94 |

What is claimed is:

1. A method of precipitating iron nanoparticles from acid mine discharge, comprising:
    providing an acid mine discharge ("AMD") solution comprising 5 to 5000 ppm by mass iron and having an O2 concentration of 4 ppm by mass or less;
    adding sodium or potassium borohydride into acid mine discharge to precipitate iron nanoparticles comprising at least 90 wt % Fe; and
    wherein no hydroxide or substantially no hydroxide is added to the acid mine discharge.

2. The method of claim 1 wherein the acid mine discharge solution has an O2 concentration of 1 ppm by mass or less, or 0.5 ppm or less.

3. The method of claim 1 conducted in the solution temperature range of 1 to 30° C.

4. The method of claim 1 wherein the borohydride is added in at least a 1:1 molar amount with Fe in solution.

5. The method of claim 1 wherein the borohydride is added in an amount of 2:1 molar amount or less with Fe in solution.

6. The method of any of the above claims wherein the precipitate comprises at least 95% Fe.

7. The method of claims 1-4 and 5 wherein the precipitate is collected on baffles in a flowing stream.

8. A method of precipitating iron nanoparticles from acid mine discharge, comprising:
    providing an acid mine discharge solution comprising 5 to 5000 ppm by mass iron and having an O2 concentration of 4 ppm by mass or less;
    adding sodium or potassium borohydride into acid mine discharge to precipitate iron nanoparticles; and
    wherein no hydroxide or substantially no hydroxide is added to the acid mine discharge; and
    wherein pH is maintained between 3 and 8.

9. The method of claims 1-4, 5 and 8, any of the above claims wherein the borohydride is added into a flowing stream, or added into a stirred tank.

10. The method of claims 1-4, 5 and 8, any of the above claims wherein the sodium or potassium borohydride is added as a powder or in solution.

11. The method of claims 1-4, 5 and 8, any of the above claims wherein the dissolved iron concentration in the acid mine discharge is maintained at 10 ppm Fe or more.

12. The method of claims 1-4, 5 and 8, any of the above claims wherein the AMD comprises at least 10 ppm Fe.

13. The method of claims 1-4, 5 and 8, wherein the AMD comprises at least 0.1 ppm, or at least 1 ppm of: Cu, Cd, Zn, Mn, S, Si, Al, Ni, or As, or any combination thereof.

14. The method of claims 1-4, 5 and 8, wherein the AMD solution comprises at least 5 ppm Mn, and wherein the method removes a first percentage of Fe from the AMD and a second percentage of Mn; wherein the first percentage is higher than the second percentage.

15. The method of claim 14 wherein the first percentage is at least two times, or at least three times, or at least 10 times that of the second percentage.

16. The method of claims 1-4, 5 and 8, wherein the AMD comprises at least five (or all) of the species selected from the group consisting of: $SO_4$ 15-11,000 ppm, Fe 10-4,100 ppm, Mn 19-7,400 ppm, Al 7-108,000 ppm, Cu 0.4-190 ppm, Ni 2-3,200 ppm, Zn 0.5-10,000 ppm, Pb 11,000 ppm, and As 0.002-54 ppm.

17. A collection of iron nanoparticles,
wherein the iron nanoparticles comprise at least 80 wt % Fe; and further comprising at least two of the following:
0.03 to 1.0 wt % Mg; 0.05 to 2.0 wt % Ca; and 0.03 to 1.0 wt % S.

18. The collection of claim 17 wherein either number average or mass average of iron nanoparticles is in the range of 5 to 300 nm; or 10 to 50 nm; or 20 to 40 nm.

19. The collection of claim 17 wherein the collection of nanoparticles is dispersed in acid mine discharge.

20. The collection of claim 17 wherein the iron nanoparticles comprise at least 90 wt %, or at least 92 wt %, or at least 95 wt %, or at least about 98 wt %, or at least 99 wt % Fe.

21. The collection of claim 17 wherein the iron nanoparticles comprise 0.05 to 0.5 wt % Mg, up to about 1.0 wt % K, 0.05 to 0.7 wt % Na, 0.2 to 2.0 wt % Ca; and about 0.1 to 0.5 wt % S.

22. The collection of claim 17 wherein the iron nanoparticles comprise at least three of the following 0.03 to 1.0 wt % Mg; 0.05 to 2.0 wt % Ca; and 0.03 to 1.0 wt % S.

23. The collection of claim 17 wherein the iron nanoparticles comprise a zero valent iron core and an iron oxide shell.

24. The collection of claim 17 wherein the iron nanoparticles are ferromagnetic.

25. The collection of claim 17 wherein the nanoparticles comprise 2 wt % or less of oxygen.

\* \* \* \* \*